Aug. 21, 1934. J. W. HANSEN ET AL 1,971,182
SUSTAINING POWER SYNCHRONOUS ELECTRIC CLOCK, ETC
Filed May 21, 1932  4 Sheets-Sheet 3
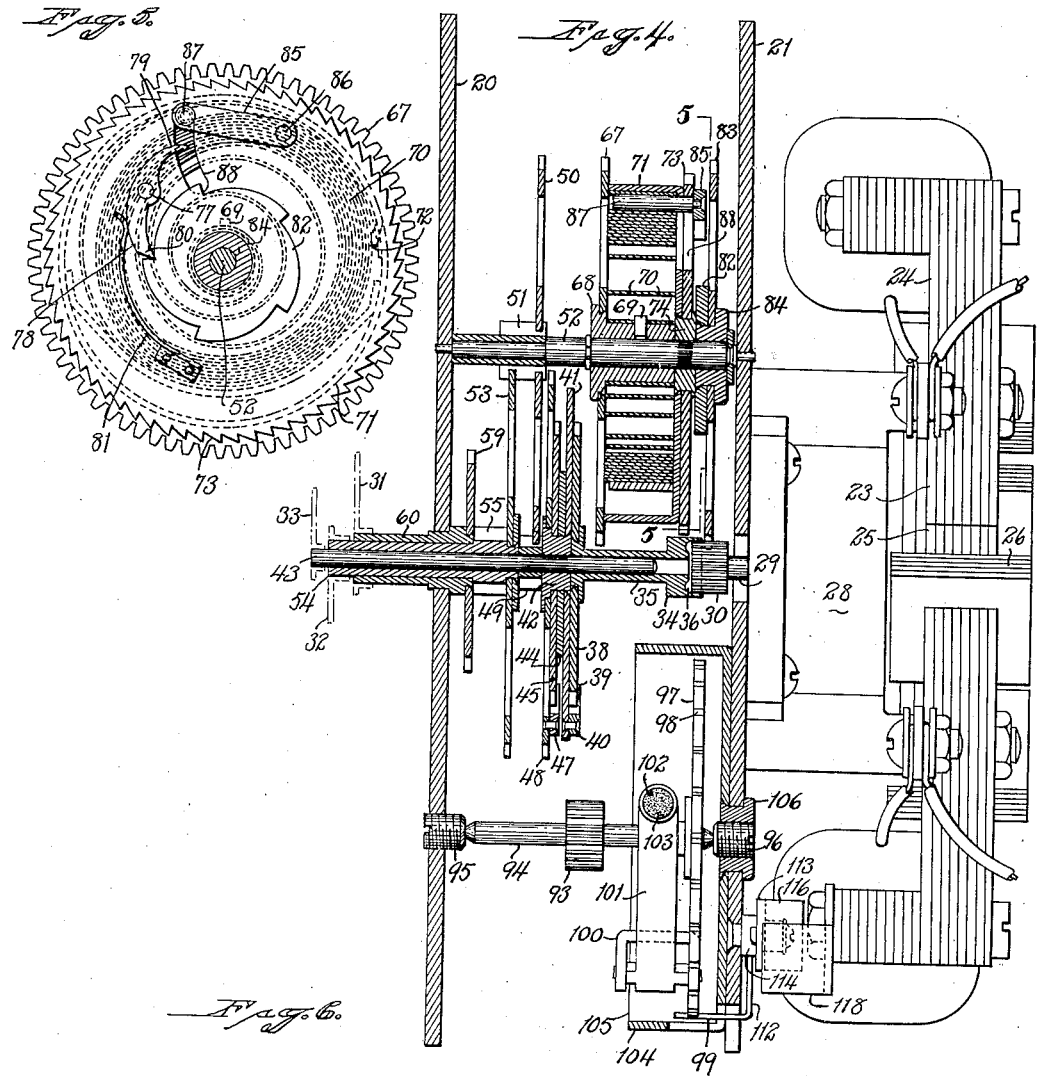
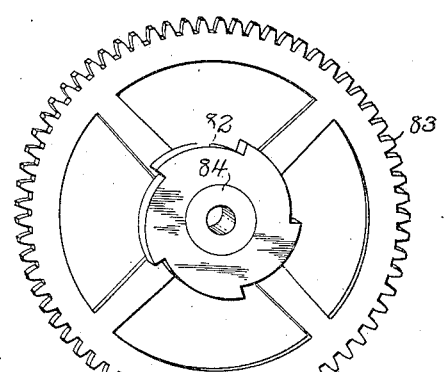

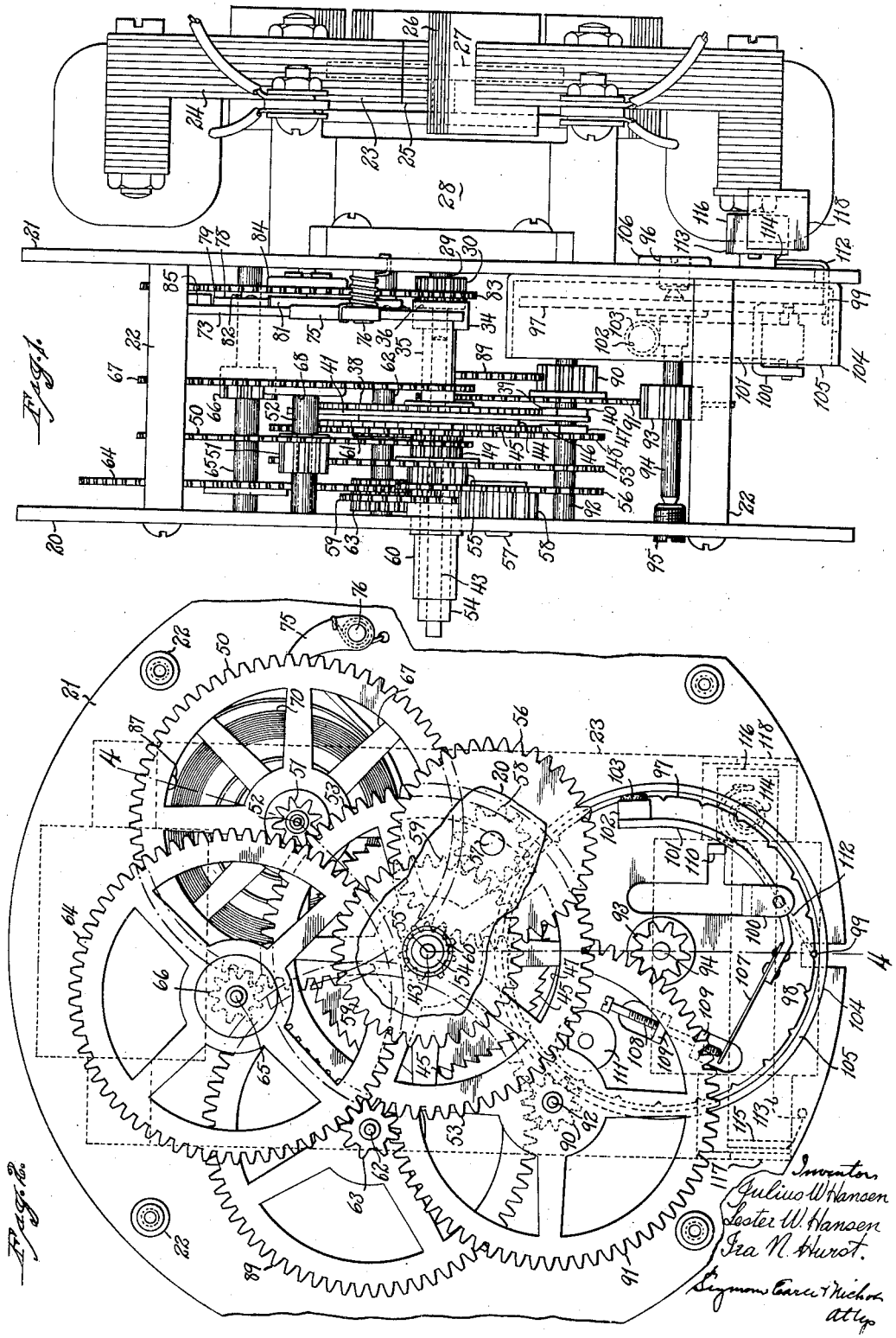

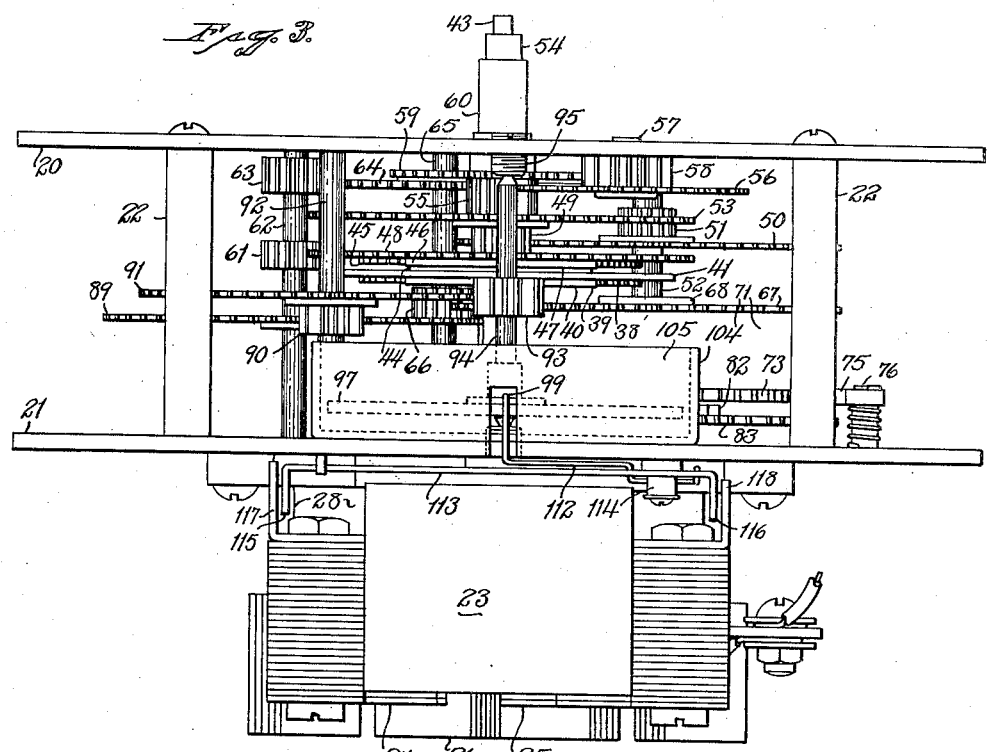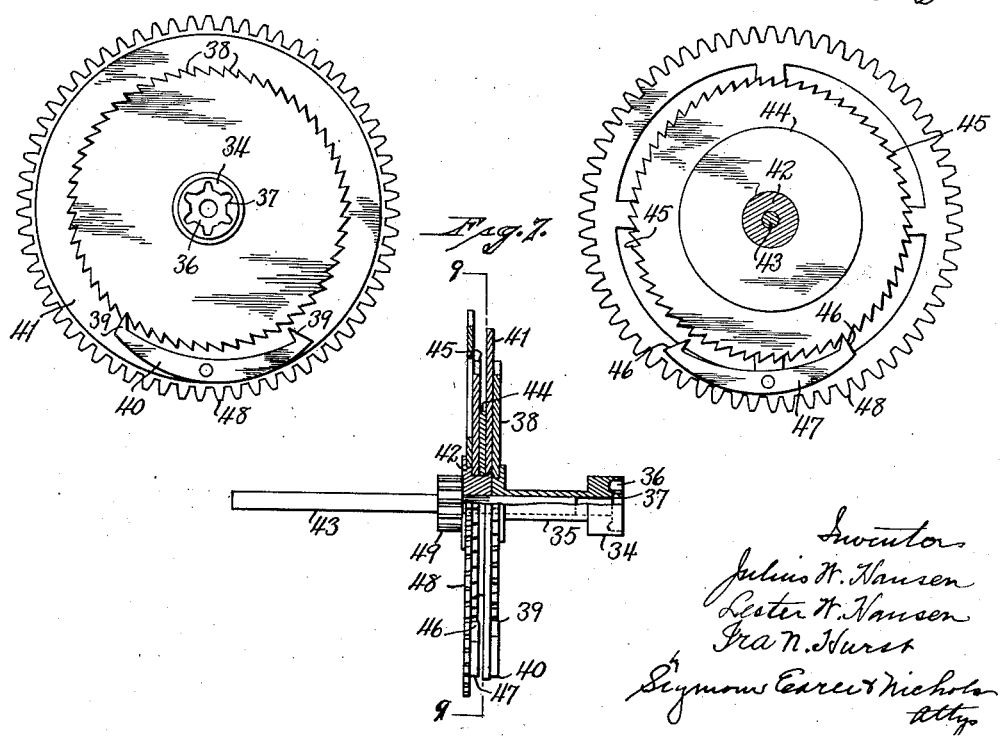

Aug. 21, 1934.  J. W. HANSEN ET AL  1,971,182
SUSTAINING POWER SYNCHRONOUS ELECTRIC CLOCK, ETC
Filed May 21, 1932  4 Sheets-Sheet 4
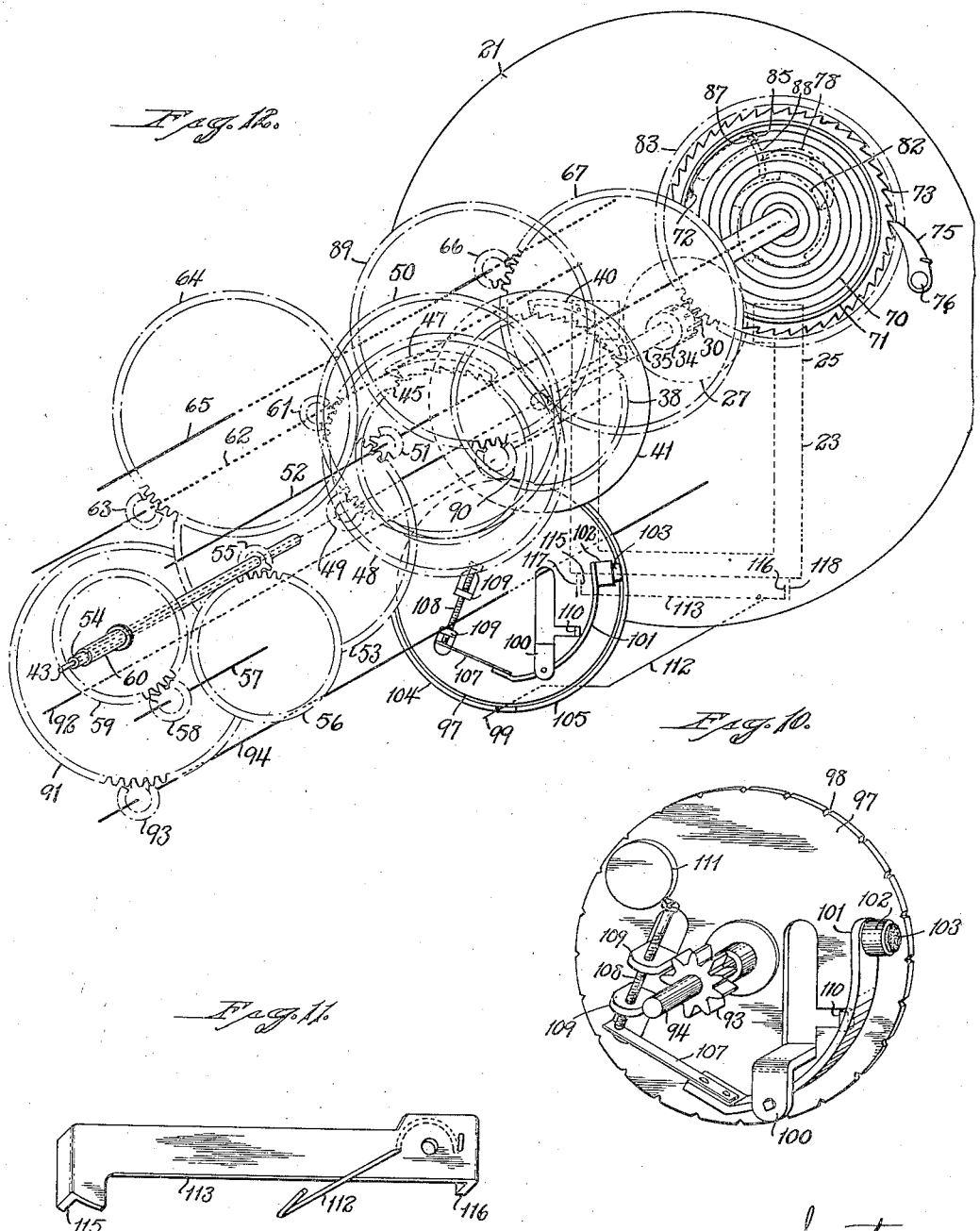

Patented Aug. 21, 1934

1,971,182

UNITED STATES PATENT OFFICE

1,971,182

SUSTAINING-POWER SYNCHRONOUS ELECTRIC CLOCK, ETC.

Julius W. Hansen, Lester W. Hansen, and Ira N. Hurst, Princeton, Ind., assignors to Hansen Manufacturing Company, Incorporated, Princeton, Ind., a corporation Application May 21, 1932, Serial No. 612,700

9 Claims. (Cl. 58—26)

This invention relates to improvement in synchronous electric clocks and other time instruments, and relates in particular to that class of synchronous electric time instruments in which, in addition to the usual synchronous motor, so-called "sustaining-power" means is provided for driving the mechanism during an interruption in the supply of current to the said synchronous motor. Such time instruments are sometimes referred to as having "carry over" movements, inasmuch as the sustaining-power feature serves to keep the mechanism in operation during current interruptions.

The particular clock herein chosen for the illustration of our invention embodies several novel features, including a simple and reliable arrangement of parts, whereby the sustaining-power feature automatically comes into action to drive the mechanism when the motor is idle, owing to a current failure, and conversely the sustaining-power feature becomes inactive upon a resumption of driving action by the synchronous motor. Ordinarily, in some of the prior designs of sustained-power clocks, a clutch-mechanism has been employed for automatically coupling the spring-train to the hands when the current supplied to the motor fails, whereas it will be noted from the following that in one phase of our invention, the need for a clutch, with its uncertainty of action, etc., is obviated and instead, a more reliable mechanism in the form of complementary ratcheting devices is employed.

As will be seen from the following, the drive-spring or equivalent energy-storing means which is employed for propelling the mechanism during an interruption in the current-supply, is energized by the synchronous motor as the same is actively engaged in propelling the hands or other time-element of the instrument.

A novel arrangement of parts is employed whereby the said spring is automatically uncoupled from the said motor when wound to a predetermined degree, to thus prevent the overloading of the motor.

A further feature which will be more fully apparent from the following consists in the novel magnetic stop- or brake-mechanism for preventing the energy-storing driving-spring from idly expending its energy when the motor is operating.

The main object of our present invention is to provide an effective and reliable time instrument capable of normally operating in synchronism with an alternating-current supply, and capable also of continuing to operate when the current-supply fails.

With the above and other objects in view as will appear from the following, our invention consists in a sustaining-power synchronous electric time instrument having certain features of construction and combinations and arrangements of parts as will be hereinafter described.

In the accompanying drawings:

Fig. 1 is a view in side elevation of one form which a sustaining-power synchronous electric clock may assume in accordance with our invention;

Fig. 2 is a view thereof in front elevation, with the major portion of the front movement-plate broken away;

Fig. 3 is an under-side view thereof;

Fig. 4 is a transverse sectional view taken on the line 4—4 of Fig. 2;

Fig. 5 is a detail sectional view taken on the line 5—5 of Fig. 4;

Fig. 6 is a perspective view of the unit consisting of the winding-wheel and ratchet-wheel;

Fig. 7 is a view partly in side elevation and partly in transverse section of the unit comprising the drive-sleeve, the seconds arbor and some of the associated parts;

Fig. 8 is a view thereof in rear-end elevation;

Fig. 9 is a transverse sectional view thereof, taken on the line 9—9 of Fig. 7;

Fig. 10 is a perspective view of the centrifugal governor-unit;

Fig. 11 is a perspective view of the unit comprising the magnetic-brake and the brake-arm carried thereby; and Fig. 12 is a schematic view illustrating the relation of the various parts of the gear-trains, etc.

The particular sustaining-power synchronous electric clock herein chosen for illustration, as an example of one form which our invention may assume, consists in the main of front and rear movement-plates 20 and 21 respectively, coupled together in spaced relationship by means of four (more or less) pillars 22. Secured to the rear face of the rear movement-plate 21 is a synchronous electric motor, generally designated by the numeral 23 and which may be of any approved type, and requires no detailed description herein other than to state that it is preferably of the self-starting synchronous type and includes a laminated stator-structure 24 having polar-projections 25 furnished with shading-coils 26 and acting in the usual manner upon a rotor 27.

The rotor 27 serves, through the intermediary of a reduction-gear train (not shown) enclosed within a gear-casing 28, to drive what we shall for convenience of description designate as a "1 R. P. M. drive-shaft" 29, which extends forwardly through the rear movement-plate 21 and mounts a 1 R. P. M. drive-pinion 30. In addition to serving to wind a driving-spring, as will hereinafter appear, the said pinion 30 serves to directly synchronously drive the hour-hand 31, minute-hand 32 and seconds-pointer 33 (timing elements) of the clock in a manner as will now be described.

Fitting over the forward end of the 1 R. P. M. drive-pinion 30 is a coupling-head 34 formed integral with a drive-sleeve 35 and having an interiorly-serrated coupling-socket 36, into which the forward end of the said pinion 30 projects and with the teeth of which its interior serrations 37 interengage so as to provide a positive coupling. The forward end of the drive-sleeve 35 has staked to it a motor-driven ratchet-wheel 38, the peripheral teeth of which are successively engaged by the complementary noses 39—39 of a double-ended oscillating pawl 40 (Fig. 8), pivotally mounted upon the rear face of a pawl-carrying plate 41 staked to the rear end of a hub 42, which latter in turn is staked to a seconds-arbor 43.

The seconds-arbor 43 carries at its extreme forward end the seconds-pointer 33, before referred to, and at its rear end it extends into and bears within the hollow interior of the drive-sleeve 35, previously referred to. Also rigidly staked to the hub 42 forwardly of the plate 41 thereon, is a spacing-washer 44 and a ratchet-wheel 45, substantially corresponding to the ratchet-wheel 38 already referred to, with the exception that its ratchet-teeth are oppositely sloped, as will be readily seen by comparing Figs. 8 and 9.

The teeth of the ratchet-wheel 45 are adapted to coact with the complementary noses 46—46 of a double-ended oscillating pawl 47 pivotally mounted upon the rear face of a gear-wheel 48, which for convenience of description may be referred to as the spring-train drive-wheel, inasmuch as it serves to cause the spring-train to drive the arbor 43 and hence the hands of the clock, as will hereinafter appear. The said gear-wheel 48 is loosely mounted upon the forward end of the hub 42 and its only positive driving connection therewith, and hence with the arbor 43 in through the intermediary of the pawl 47 and ratchet-wheel 45.

Staked upon the seconds-arbor 43 just forward of the hub 42 thereon is a pinion 49 meshing with and driving a gear-wheel 50 staked to the forward end of a pinion 51, which latter is mounted, with freedom for relative rotation, upon the reduced forward end of a so-called main-arbor 52, which latter is spring-driven, as will hereinafter appear. The pinion 51 just referred to meshes with and drives a minute-wheel 53 staked to the rear end of a minute-sleeve 54 which encircles the forward end of the seconds-arbor 43 and extends forwardly through the front movement-plate 20 and has applied to its forward end the minute-hand 32 already referred to. The said minute-sleeve 54 is cut at a point just forward of the minute-wheel 53, to form an integral pinion 55 which meshes into and drives a dial-wheel 56 mounted adjacent the rear face of the front movement-plate 20 upon a stud 57. The said dial-wheel 56 carries and drives a concentric dial-pinion 58 which, in turn, meshes into and drives an hour-wheel 59 staked to the rear end of an hour-sleeve 60 encircling the minute-sleeve 54 and projecting forwardly through the front movement-plate 20 for carrying at its forward end the hour-hand 31 already referred to.

The parts above described relate mainly to the connection between the synchronous motor and the hands of the clock for effecting the synchronous drive of the latter, through the parts 45, 47 and 48 relate to the driving of the hands by the spring-means, as will hereinafter appear.

In the event that the current supply to the synchronous motor 23 should fail, the seconds-pointer 33, minute-hand 32 and hour-hand 31 will be driven by means of a spring-powered or other energy-storing driving-train, as will now appear.

As before described, the hub 42 which is staked upon the seconds-arbor 43 carries, with freedom for relative rotation, the spring-train drive-wheel 48 which will, when occasion requires, act to propel the time-indicating means through the intermediary of its pawl 47 acting upon the ratchet-wheel 45, which latter is staked to the hub 42 as already described.

The spring-train drive-wheel 48 meshes into and is driven by a pinion 61 staked upon an arbor 62 having also staked to it, near its forward end, a pinion 63. The said pinion 63 meshes into and is driven by a gear-wheel 64 staked upon an arbor 65 also having staked to it, adjacent its rear end, a pinion 66, which latter meshes into and is driven by a main-wheel 67.

The said main-wheel 67 is staked upon the forward end of a main-spring hub 68, which latter is, in turn, free to turn upon the main arbor 52 already referred to. The said hub is provided with a radially-projecting pin 69 over which is hooked the inner end of a spiral driving-spring 70 housed within a cup-shaped spring-barrel 71, the open forward face of which is closed by the main-wheel 67 already referred to, though the said barrel and wheel are free for relative rotation with respect to each other. The outer end of the main-spring 70 is attached to the spring-barrel 71 by being hooked over a finger 72 inwardly struck from the periphery of the said spring-barrel in the usual manner of clock-movements.

Located against the rear face of the spring-barrel 71 is a ratchet-wheel 73, which, together with the said barrel, is rigidly staked upon a hub 74 which in turn is staked upon the main-arbor 52 adjacent the rear end thereof, as clearly shown in Fig. 4. A pawl 75, pivotally mounted upon a stud 76 and forwardly projecting from the rear movement-plate 21, engages the peripheral teeth of the ratchet-wheel 73 and serves to prevent the reverse turning of the spring-barrel 71.

Pivotally mounted upon a stud 77 rearwardly projecting from the ratchet-wheel 73 is a double-ended pawl 78 having a curved tail-piece 79 at one end and having its opposite end provided with a nose 80 normally pressed by means of a spring 81 carried by the said ratchet-wheel 73, into engagement with the peripheral teeth of a relatively-small spring-winding ratchet-wheel 82. The said ratchet-wheel 82, together with a winding-wheel 83, is staked to a hub 84 loosely mounted upon the main-arbor 52 adjacent the rear end thereof. The winding-wheel 83 meshes into and is driven by the 1 R. P. M. pinion 30 previously described.

The winding-wheel 83 is continuously turned by the pinion 30 for the purpose of winding the spring 70. For the purpose of automatically disconnecting the said winding-wheel 83 from the spring-barrel 71, when the said spring 70 is wound to a predetermined degree, we employ a swinging pawl-retracting arm 85 which is pivotally mounted at one end upon the rear face of the ratchet-wheel 73 by means of a stud 86 rearwardly projecting from the latter. At its free end the said arm carries a stud-like finger 87 projecting forwardly through an arcuate slot 88 into the interior of the spring-barrel 71 and inside the outer convolution of the spring 70.

When the spring is wound to a predetermined degree, as will hereinafter appear, its outer convolution will move the finger 87 inward with the effect of swinging the arm 85 against the tail-piece 79 of the pawl 78 to thus disengage the nose 80 thereof from the teeth of the ratchet-wheel 82 and thus suspend the further winding of the said spring.

When during an interruption in the current supply to the motor 23 the spring 70 is called upon to drive the hands of the clock, it is obvious that some governor must be employed to fix and determine the rate of speed at which the hands of the clock shall, under these conditions, be driven. For the purpose referred to we mount upon the arbor 62 of the spring-train a gear-wheel 89 meshing into and driving a pinion 90 secured to a gear-wheel 91 and mounted, together with the said pinion 90, upon an arbor 92 journaled between the front and rear movement-plates 20 and 21. The gear-wheel 91 meshes into and drives a pinion 93 staked upon a governor-shaft 94 having its respective opposite ends tapered and bearing in adjustable bearing-screws 95 and 96 respectively mounted in the front and rear movement-plates 20 and 21.

The governor-shaft 94 just above referred to has staked to it, adjacent its rear end, a mounting-disk 97 having equidistant notches 98 formed in its periphery for the purpose of receiving a resilient stop-finger 99, as will hereinafter appear. The said mounting-disk has struck from it a forwardly-and-outwardly-extending L-shaped mounting-arm 100 between the terminal-reach of which latter and the disk proper is journaled an arcuate centrifugal governor-arm 101 carrying at its free end an outwardly-projecting socket 102 having mounted in it and projecting from its outer face a friction-shoe 103 formed of leather or other suitable friction material.

The friction-shoe 103 just referred to is adapted to frictionally engage the inner surface of the forwardly-projecting flange 104 of a cup-shaped housing 105. The said housing is anchored to the forward face of the rear movement-plate 21 by means of a bushing 106 through which the bearing-screw 96 extends, as clearly shown in Fig. 4.

At its end, opposite the friction-shoe 103, the governor-arm 101 has riveted or otherwise secured to it a sheet-metal spring 107 the free end of which latter is engaged by the outer end of a tensioning-screw 108 threaded through a pair of complementary ears 109 struck forwardly from the disk 97. The spring 107 just referred to tends to swing the arm 101 so as to normally maintain its friction-shoe 103 out of engagement with the inner surface of the flange 104 of the housing 105, and this swinging movement is limited by a stop-finger 110 struck forwardly from the disk 97, as clearly shown in Fig. 10 of the drawings.

For the purpose of dynamically balancing the mass, including the mounting-disk 97 and the parts carried thereby, we mount upon the said disk, at a point substantially opposite the centrifugal governor-arm 101, a counterweight 111.

For the purpose of automatically stopping the spring-driven train when the motor is operating, and conversely for automatically unlocking the spring-train when the motor stops, we employ the resilient stop-finger 99 before referred to, which is adapted to engage the periphery of the disk 97 and the notches 98 therein, as before described.

The resilient stop-finger 99 is formed integrally with and forwardly offsets from the outer end of a stop-arm 112, preferably formed of light spring wire and suitably secured to the forward face of an oscillating magnetic brake-lever 113, formed of sheet-iron or other magnetic material and pivotally mounted adjacent the end from which the stop-arm 112 offsets upon a stud 114.

At its respective opposite ends the brake-lever 113 is rearwardly bent to form fingers 115 and 116 respectively positioned adjacent L-shaped polar-projections 117 and 118 forwardly offsetting from the laminated stator-structure 25 of the motor 23. By virtue of being mounted at one end, when the current-supply to the motor fails, the brake-lever 113 will swing downward by gravity so as to move the stop-finger 99 out of engagement with the periphery of the mounting-disk 97. Conversely, when the motor is energized the said brake-lever 113 will tend to move into line between the polar-projections 117 and 118, with the effect of bringing the stop-finger 99 into engagement with the periphery of the said disk 97 to stop the rotation of the same and hence stop the spring-driven train, all in a manner as will be more fully set forth.

For the purpose of making clear the operation of our sustaining-power synchronous electric clock, let it be presumed that the spring 70 is substantially unwound and that the synchronous motor 23 is being energized by alternating current of the proper frequency. Under the conditions just described, the synchronous motor 23 will serve to simultaneously synchronously drive the seconds-pointer 33, minute-hand 32 and hour-hand 31, and at the same time wind the spring 70, and thereafter, under ordinary conditions, maintain the same in an energized condition, ready to take up the burden of driving the time-indicating means when the current fails.

When the motor is operating, the resilient stop-finger 99 will be held in engagement with the periphery of the disk 97 of the centrifugal governor to thus restrain the spring-train from acting, and at the same time the seconds-arbor 43 of the clock and hence the hour- and minute-hands 31 and 32 which are geared thereto will be synchronously driven by the motor through the following train of parts. The 1 R. P. M. pinion 30 will serve to turn the drive-sleeve 35 at a corresponding rate of speed and hence turn, in a clockwise direction, the ratchet-wheel 38 staked thereto. The turning of the ratchet-wheel 38 will be communicated to the pawl-carrying plate 41 by means of the pawl 40 carried thereby. The turning of the plate 41 as just described will turn the hub 42 to which it is staked and in turn rotate the seconds-arbor 43 to which the said hub is staked. The minute-hand 32 will be driven in consonance with the seconds-arbor through the reduction-gear-train, including the pinion 49, gear-wheel 50, pinion 51, minute-wheel 53 and minute-sleeve 54. Similarly, the hour-hand 31 will be driven in consonance with the seconds-arbor 43 and minute-sleeve 54 by the reduction-gear-train, including the minute-pinion 55 of the minute-sleeve 54, dial-wheel 56, dial-pinion 58, hour-wheel 59 and the hour-sleeve 60, to the forward end of which latter the said hour-hand 31 is attached.

While the hub 42 is turning as above described, the ratchet-wheel 45 thereon will be turning also, but its peripheral teeth will be idly ratcheting under the noses 46—46 of the pawl 47, so that the drive-wheel 48 of the spring-train which carries the said pawl 47 will remain unaffected.

As the seconds-pointer 33 and the hour- and minute-hands 31 and 32 are being synchronously driven, the 1 R. P. M. pinion 30 will also rotate the winding-wheel 83, ratchet-wheel 82 and through the intermediary of the pawl 78 will turn the ratchet-wheel 73 and spring-barrel 71. The turning of the spring-barrel 71 to which the outer end of the spring 70 is attached will serve to wind the said spring until such time as the said spring has become wound to a predetermined degree, at which time its outer convolution will swing the arm 85 inward into engagement with the tail-piece 79 of the pawl 78, thus swinging the latter and disengaging its nose 80 from the ratchet-wheel 82.

As soon as the said nose 80 is swung out of engagement with the ratchet-wheel 82 as just described, the winding of the spring will cease and the reverse movement of the spring-barrel will be prevented by means of the pawl 75 which is normally engaged with the teeth of the ratchet-wheel 73.

Should for any reason, however, the spring 70 become unwound, the outer convolution of the same will move outwardly and thus permit the pawl 78 to have its nose reengaged by the spring 81 with the ratchet-wheel 82 for again winding the said spring. When the spring has thus been rewound to a predetermined tension, the pawl 78 will be again automatically disengaged from the ratchet-wheel 82 and the winding action will again cease.

The above description of operation relates mainly to the action during the time when the motor is actively driving the hands of the clock.

Now in the event that an interruption takes place in the current-supply to the motor 23, the 1 R. P. M. pinion 30 and such parts as are rigidly coupled thereto will cease to function and, at the same time, gravity will act to swing the magnetic brake-lever 113 downward so as to disengage the stop-arm 99 from the periphery of the disk 97, so that the latter, together with the parts carried thereby, will instantaneously start to rotate under the urge of the spring 70 and thus propel the hands at a rate of speed substantially corresponding to the speed at which they have been previously driven by the synchronous motor.

In driving the hands as just above described, the spring 70 acts through its hub 68 to turn the main-wheel 67 which in turn drives the pinion 66, arbor 65, wheel 64, pinion 63, arbor 62 and pinion 61, which latter meshes into and turns the spring-train drive-wheel 48. The pawl 47 carried by the said drive-wheel 48 will serve to couple the ratchet-wheel 45 with the said wheel 48 and since the said ratchet-wheel 45 is staked to the hub 42, the seconds-arbor 43 will be turned, as will also the pointer 33, the hour-hand 31 and the minute-hand 32.

During the period when the spring is driving the hands of the clock as above described, the pawl-carrying plate 41 will also be turning with the hub 42 and seconds-arbor 43, but its pawl 40 will idly ratchet over the teeth of the ratchet-wheel 38, which latter, as before described, is rigidly coupled to the motor.

During the driving of the hands by the spring 70, the said spring is restrained from expending its energy at any other rate than in substantial accordance with correct time, by the friction-shoe 103, since the said shoe is connected to the arbor 62 which is driving the spring-train drive-wheel 48, by the gear-wheel 89, pinion 90, gear-wheel 91, pinion 93, shaft 94 and mounting-disk 97.

Upon a resumption of the current-supply to the motor 23, the brake-lever 113 will be swung upwardly to engage the stop-arm 99 with the periphery of the disk 97 to thus stop the spring-driven train and permit the synchronous motor to operate in the usual way to drive the hands of the clock.

From the foregoing it will be seen that upon an interruption in the current-supply to the synchronous motor, the spring-train will automatically assume the burden of driving the hands of the clock at approximately correct time and that automatically upon the resumption of the current-supply to the motor, the spring-train will be automatically stopped and the motor automatically resume the synchronous drive of the hands. These two results are accomplished without the employment of clutch-mechanisms which in addition to being noisy are uncertain of engagement and open to various other objections too numerous to mention.

It is obvious without further illustration that the centrifugal-governor shown may be replaced by any one of a wide variety of governing-devices, such, for instance, as an escapement-mechanism of the type commonly employed in spring-driven time instruments.

The particular movement herein chosen for illustration is designed to propel clock-hands for the visual indication of time, but we wish to have it understood that our invention is not limited to the visual indication of time, since the hands may be replaced by any timing-element, such for instance as a timing-disk for operating or controlling a time-switch mechanism without in any way affecting the supplemental action of the spring-train, etc., and it will be understood by those skilled in the art that our invention may assume varied physical forms without departing from our inventive concept, and we, therefore, do not limit ourselves to the specific embodiment herein chosen for illustration, but only as indicated in the appended claims.

We claim:

1. In a sustaining-power synchronous electric timing-device, the combination with a driven timing-element; of a synchronous electric motor and an energy-storing motor for driving the said timing-element; a ratchet-mechanism interposed between the said synchronous electric motor and the said timing-element; and a second ratchet-mechanism interposed between the said energy-storing motor and the said timing-element; the said ratchet-mechanisms including parallel ratchet-wheels respectively having oppositely-directed teeth and being constructed and arranged to permit either one of the said motors to advance the said timing-element without also driving the other of the two said motors.

2. In a sustaining-power synchronous electric timing-device, the combination with a driven arbor; of a synchronous electric motor and an energy-storing motor for driving the said arbor; a ratchet-wheel and pawl interposed between the said synchronous electric motor and the said arbor; and a second ratchet-wheel and pawl interposed between the said energy-storing motor and the said arbor; both of the said ratchet-wheels being coaxial with respect to the said arbor and arranged so that their respective ratchet-teeth point in opposite directions to permit either one of the said motors to advance the said arbor without also driving the other of the said motors.

3. In a sustaining-power synchronous electric timing-device, the combination with a driven timing-element; of a synchronous electric motor and a spring motor for driving the said timing-element; magnetically-operated stop-means for stopping the said spring motor from expending its energy when the said timing-element is being driven by the said electric motor; and a mechanical connection between the said synchronous electric motor and the said spring motor for causing the former to energize the latter, including a movable coupling-member operatively-connected to the said spring motor for being retracted thereby when the same is energized to a predetermined degree to thus prevent the said stop-means from also stopping the said electric motor.

4. In a sustaining-power synchronous electric time device, the combination with a driven time-element; of a synchronous electric motor and an energy-storing motor for driving the said time-element; a mechanical connection between the said synchronous electric motor and the said energy-storing motor for causing the former to energize the latter, including a clutch-mechanism moved into its unclutching position by the said energy-storing motor when the energy stored therein reaches a predetermined maximum; whereby the said synchronous electric motor is automatically relieved of the burden of continuously supplying energy to the said energy-storing motor.

5. In a sustaining-power synchronous electric time device, the combination with a driven time-element; of a synchronous electric motor and an energy-storing motor for driving the said time-element; a mechanical connection between the said synchronous electric motor and the said energy-storing motor for causing the former to energize the latter, including a pivotal clutch-pawl swung into its unclutching position by the said energy-storing motor when the energy stored therein reaches a predetermined maximum; whereby the said synchronous electric motor is automatically relieved of the burden of continuously supplying energy to the said energy-storing motor.

6. In a sustaining-power synchronous electric time device, the combination with a driven time-element; of a synchronous electric motor and an energy-storing driving-spring for driving the said time-element; a mechanical connection between the said synchronous electric motor and the said driving-spring for causing the former to energize the latter, including a clutch mechanism moved into its unclutching position by the said driving-spring when the energy stored therein reaches a predetermined maximum; whereby the said synchronous electric motor is automatically relieved of the burden of continuously tensioning the said driving-spring.

7. In a sustaining-power synchronous electric time device, the combination with a driven time-element; of a synchronous electric motor and an energy-storing driving-spring for driving the said time-element; a mechanical connection between the said synchronous electric motor and the said driving-spring for causing the former to energize the latter, including a pivotal clutch-pawl swung into its unclutching position by the said driving-spring when the energy stored therein reaches a predetermined maximum; whereby the said synchronous electric motor is automatically relieved of the burden of continuously tensioning the said driving-spring.

8. In a sustaining-power synchronous electric time device, the combination with a driven time-element; of a synchronous electric motor and a spiral driving-spring for driving the said time-element; a mechanical connection between the said synchronous electric motor and the said spiral driving-spring for causing the former to energize the latter, including a clutch-mechanism moved into its unclutching position by the contraction of the convolutions of the said spiral driving-spring; whereby the said synchronous electric motor is automatically relieved of the burden of continuously winding the said spiral driving-spring.

9. In a sustaining-power synchronous electric time device, the combination with a driven time-element; of a synchronous electric motor and a spiral driving-spring for driving the said time-element; a mechanical connection between the said synchronous electric motor and the said spiral driving-spring for causing the former to energize the latter, including a pivotal clutch-pawl swung into its unclutching position by the contraction of the convolutions of the said spiral driving-spring; whereby the said synchronous electric motor is automatically relieved of the burden of continuously winding the said spiral driving-spring.

JULIUS W. HANSEN.
LESTER W. HANSEN.
IRA N. HURST.